Sept. 8, 1931. A. L. HENRY 1,822,621
TROLLEY SHOE
Filed Oct. 23, 1930
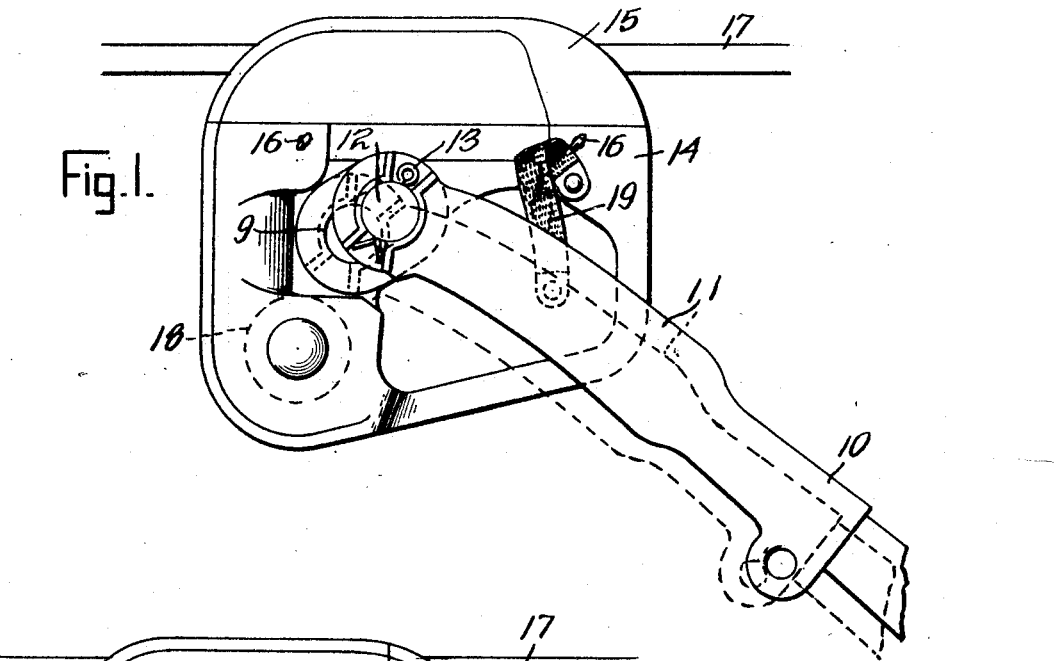
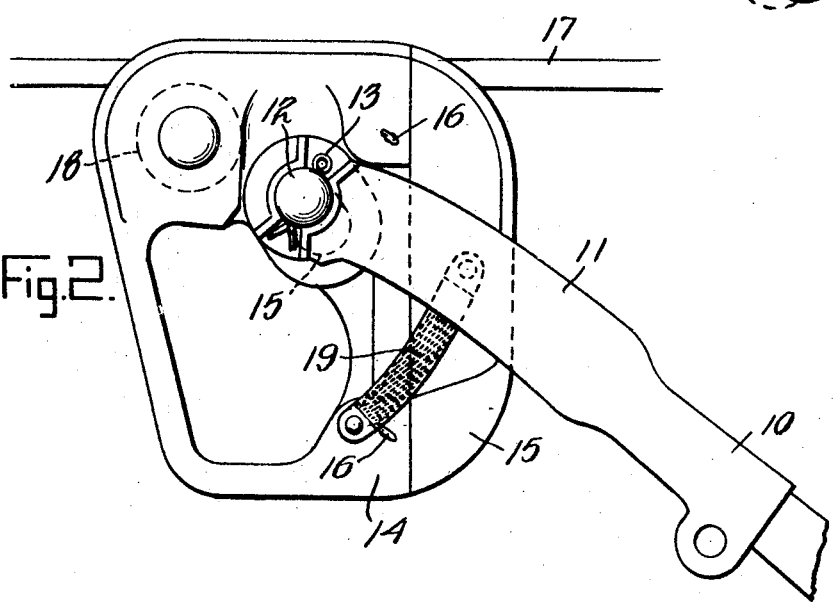
Inventor
Andrew L. Henry
By
Attorney Patented Sept. 8, 1931

1,822,621

UNITED STATES PATENT OFFICE

ANDREW L. HENRY, OF INDIANAPOLIS, INDIANA, ASSIGNOR TO TROLLEY SHOE WHEEL CO., OF INDIANAPOLIS, INDIANA, A CORPORATION OF INDIANA

TROLLEY SHOE

Application filed October 23, 1930. Serial No. 490,787.

This invention relates to trolley shoes and an object of the invention is to provide a new and improved trolley shoe arrangement which will be particularly effective in backing up of the car.

A further object is to provide means for maintaining good electrical contact between the trolley shoe and the harp.

Other objects and advantages will become apparent as the description proceeds.

Referring to the accompanying drawings, which are made a part hereof and on which similar reference characters indicate similar parts, Figure 1 is a side elevation of the invention showing the position of the shoe during forward movement of the car, and Figure 2, a side elevation in position during the backing of the car.

Reference character 10 indicates a harp having upper forks 11 in which is mounted a pin 12, the pin being secured in position in any suitable way as by a cotter pin 13. A trolley shoe 14 is provided with an elongated eye 9 in which eye it is carried upon the pin 12. The shoe 14 is provided with a contact tread 15 secured thereto in any suitable way as by pins or keys 16, the tread 15 making contact with the wire 17. Mounted in the shoe 14 also is a roller 18 which is adapted to be brought into contact with the trolley wire during backing of the car, as shown in Figure 2. In order to provide electrical contact between the harp 10 and the trolley shoe a plurality of copper shunt cables 19 are provided, being secured at one end to the shoe and at their other end to the harp. Any highly conductive material may be used for these wires, preferably copper.

In operation during forward movement of the car, as shown in Figure 1 the trolley shoe is in the position shown with the tread 15 in slidable contact with the wire 17. When the car moves in reverse the pin 12 slides down the elongated eye slot 9 to increase the leverage between the pin 12 and the point of contact of the tread 15 with the wire 17. This increases the leverage and thus assists in rotating the trolley shoe clockwise to bring the wheel 18 into contact with the wire 17. The position occupied by the shoe as shown in Fig. 2 during backing of the car and that shown in Fig. 1 during the forward travel of the car are substantially at 90 degrees apart. The slot 9 therefore is positioned on about a 45 degree angle with the bottom of the groove in the contact tread 15. When the car starts forward the shoe being in the position shown in Fig. 2 the pin 12 again slides down in the elongated slot 9 moving the pin further from the center of its pivot point on the trolley wire so as to assist in rotating it counterclockwise to bring it to the position shown in Figure 1. If the slot were made in the shoe horizontally to the tread 15, the additional pressure supplied by the movement of the holder 14 would be insufficient to cause the shoe to turn over, particularly when the tread 15 is badly worn. By making the slot at an angle as shown the necessary leverage is supplied so that the shoe turns over at the slightest backward movement of the car even when the tread is completely worn out.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. A trolley shoe having a tread for contacting with a wire, a carrier for said tread, a harp, a pin carried by said harp for supporting said carrier, the carrier having an elongated slot to provide a channel in which the said pin can travel, thus permitting the said carrier to move obliquely forward and backward on the said pin to aid in the rotation of the shoe in backing up, substantially as set forth.

2. A trolley shoe having a tread for contacting with a wire, a carrier for said tread, a harp, a pin carried by said harp for supporting said carrier, the carrier having an elongated slot to provide a channel in which the said pin can travel, thus permitting the said carrier to move obliquely forward and backward on the said pin to aid in the rotation of the shoe in backing up, the slot extending at an oblique angle with respect to the shoe, substantially as set forth.

3. A sliding trolley for an electrically driven car comprising a trolley harp, a shoe pivotally mounted on said harp, said shoe carrying a contact tread for engagement with the wire, said shoe having an elongated slot by means of which it is pivotally mounted upon the harp, said slot extending at an angle to the trolley wire so that either forward or backward movement of the car will tend to move the pin a greater distance from the point of pivoting on the wire, to cause the shoe to rotate more easily into position for forward or backward movement depending on the direction in which the car is traveling, substantially as set forth.

4. The combination with a trolley harp of a trolley shoe pivotally attached to the harp, said pivoted connection including a pin in the harp traveling in an elongated slot in the shoe, a tread on the shoe for engaging a trolley wire, said slot extending substantially at a 45° angle with the contact face of the tread, substantially as set forth.

5. The combination with a trolley harp of a trolley shoe pivotally attached to the harp, said pivoted connection including a pin in the harp traveling in an elongated slot in the shoe, a tread on the shoe for engaging a trolley wire, said slot extending substantially at a 45° angle with the contact face of the tread, and a plurality of shunt cables attached to the said shoe and the said harp to provide good electric conductivity between them, substantially as set forth.

In witness whereof, I have hereunto set my hand and seal at Indianapolis, Indiana, this 15th day of October, A. D. nineteen hundred and thirty.

ANDREW L. HENRY.